United States Patent [19]
Holcomb

[11] Patent Number: 5,305,527
[45] Date of Patent: Apr. 26, 1994

[54] METHOD AND APPARATUS FOR PEELING PRODUCE SUCH AS GARLIC

[75] Inventor: David A. Holcomb, Seattle, Wash.

[73] Assignee: Chef,N Corporation, Seattle, Wash.

[21] Appl. No.: 46,380

[22] Filed: Apr. 8, 1993

Related U.S. Application Data

[63] Continuation of Ser. No. 873,459, Apr. 24, 1992, abandoned.

[51] Int. Cl.$^5$ .................. B26B 11/00; B26B 3/00; B23N 7/00
[52] U.S. Cl. .................... 30/123.5; 30/302; 99/587
[58] Field of Search ............. 30/123.5, 130, 301, 30/302, 316; 99/587

[56] References Cited

U.S. PATENT DOCUMENTS

| | | |
|---|---|---|
| 317,966 | 5/1885 | Brown . |
| 1,137,841 | 5/1915 | Cookson .................. 99/586 |
| 1,221,598 | 4/1917 | Roberts . |
| 1,237,251 | 8/1917 | Lyng ......................... 99/587 |
| 2,396,444 | 3/1946 | Singer ..................... 99/590 X |
| 2,521,115 | 9/1950 | Calkins ..................... 146/4 |
| 2,629,168 | 2/1953 | Shpentuk ................... 30/24 |
| 2,733,100 | 1/1956 | Simonsen .................. 299/60 |
| 2,908,305 | 10/1959 | Wilms et al. ............... 146/17 |
| 2,990,615 | 7/1961 | Ohler ........................ 30/316 |
| 3,077,909 | 2/1963 | Trenor ........................ 146/4 |
| 3,292,257 | 12/1966 | Popeil ........................ 30/301 |
| 3,696,848 | 10/1972 | Mellon et al. .............. 146/83 |
| 3,810,308 | 5/1974 | Stubbmann ................ 30/130 |
| 4,104,796 | 8/1978 | Sheldon . |
| 4,516,460 | 5/1985 | Vizecky ..................... 30/302 |
| 4,545,297 | 10/1985 | Ihlow ......................... 99/586 |
| 4,546,545 | 10/1985 | Hirano ....................... 30/302 |
| 4,557,052 | 12/1985 | Baba et al. . |
| 4,566,189 | 1/1986 | Muto . |
| 4,672,798 | 6/1987 | Ota . |
| 4,817,287 | 4/1989 | Arnold ....................... 30/302 |
| 4,817,288 | 4/1989 | Hirose et al. . |
| 4,959,903 | 10/1990 | Daoust ...................... 30/123.5 |
| 4,982,499 | 1/1991 | Fortin ........................ 30/123.5 |
| 4,998,465 | 3/1991 | Fischer et al. ............. 99/584 |
| 5,021,254 | 6/1991 | Fischer et al. ............. 426/482 |
| 5,065,672 | 11/1991 | Federighi, Sr. ............. 99/631 |
| 5,101,720 | 4/1992 | Bianchi ..................... 100/99 |

FOREIGN PATENT DOCUMENTS

| | | |
|---|---|---|
| 705089 | 3/1965 | Canada ...................... 30/302 |
| 58433 | 2/1941 | Denmark . |
| 195613 | 6/1907 | Fed. Rep. of Germany . |
| 221814 | 5/1909 | Fed. Rep. of Germany . |
| 734746 | 3/1943 | Fed. Rep. of Germany ..... 99/586 |
| 3334659 | 4/1985 | Fed. Rep. of Germany . |

OTHER PUBLICATIONS

English summary of Jap. Pat. No. 2-163003.

*Primary Examiner*—Richard K. Seidel
*Assistant Examiner*—Paul M. Heyrana, Sr.
*Attorney, Agent, or Firm*—Seed and Berry

[57] ABSTRACT

Apparatus and method for peeling the husk from produce such as garlic cloves in which cup means are provided with circumferentially spaced, inwardly biased prongs that converge toward an exit end, the prongs having gripping members adjacent the exit end. A plunger is provided for pushing the garlic meat relative to the husk while the husk is being held by the gripping members. In the method, the husk is held and gripped at the circumferentially spaced locations while the meat is pressed axially of the husk relative to the husk while the husk is being gripped. Preferably, the husk is simultaneously scored or cut as it is gripped to split the husk.

18 Claims, 4 Drawing Sheets

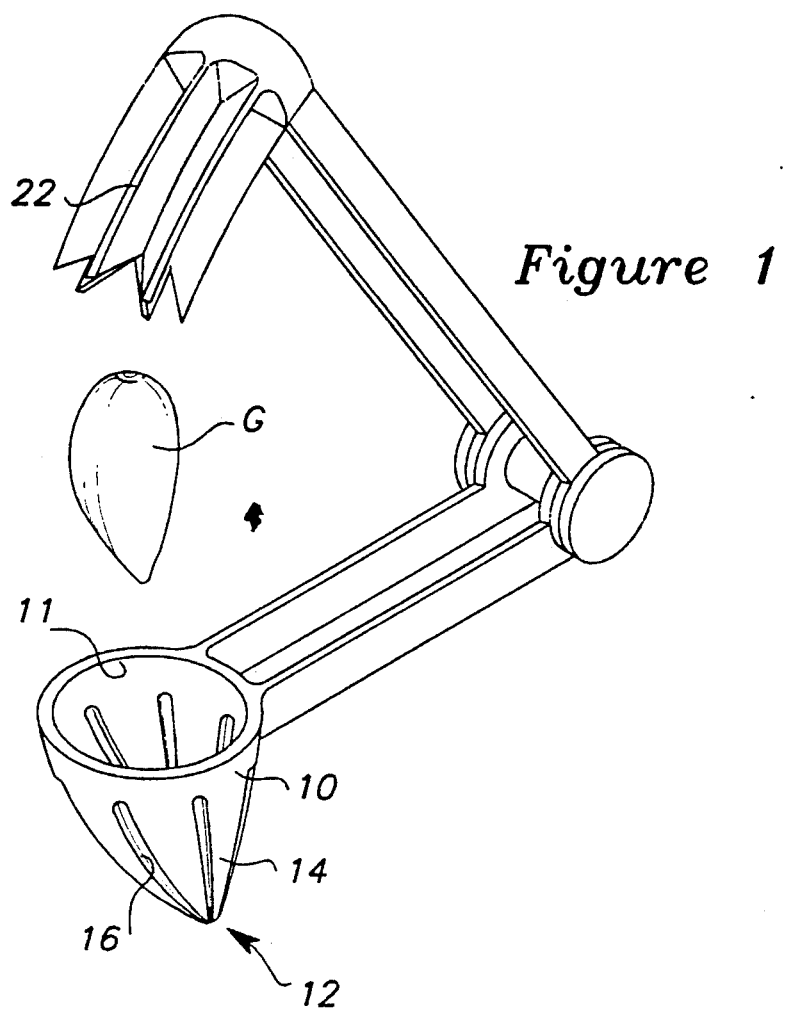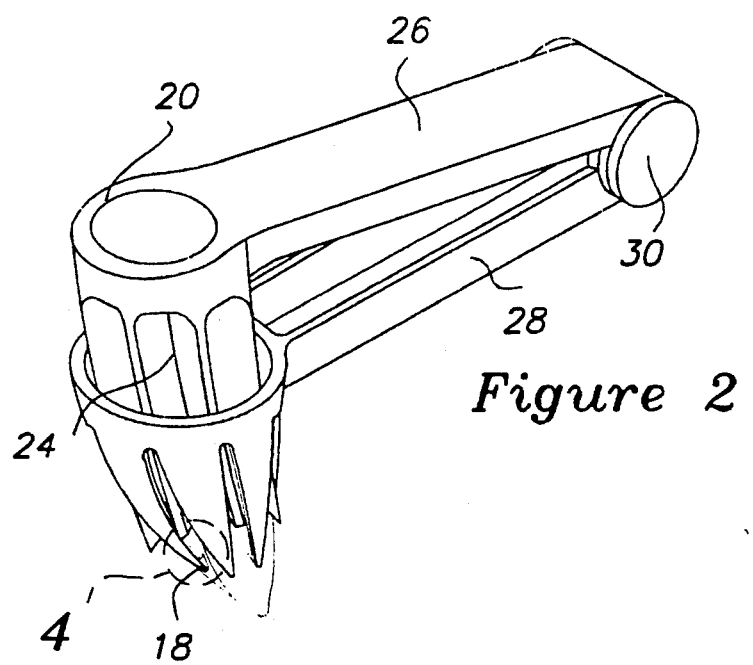

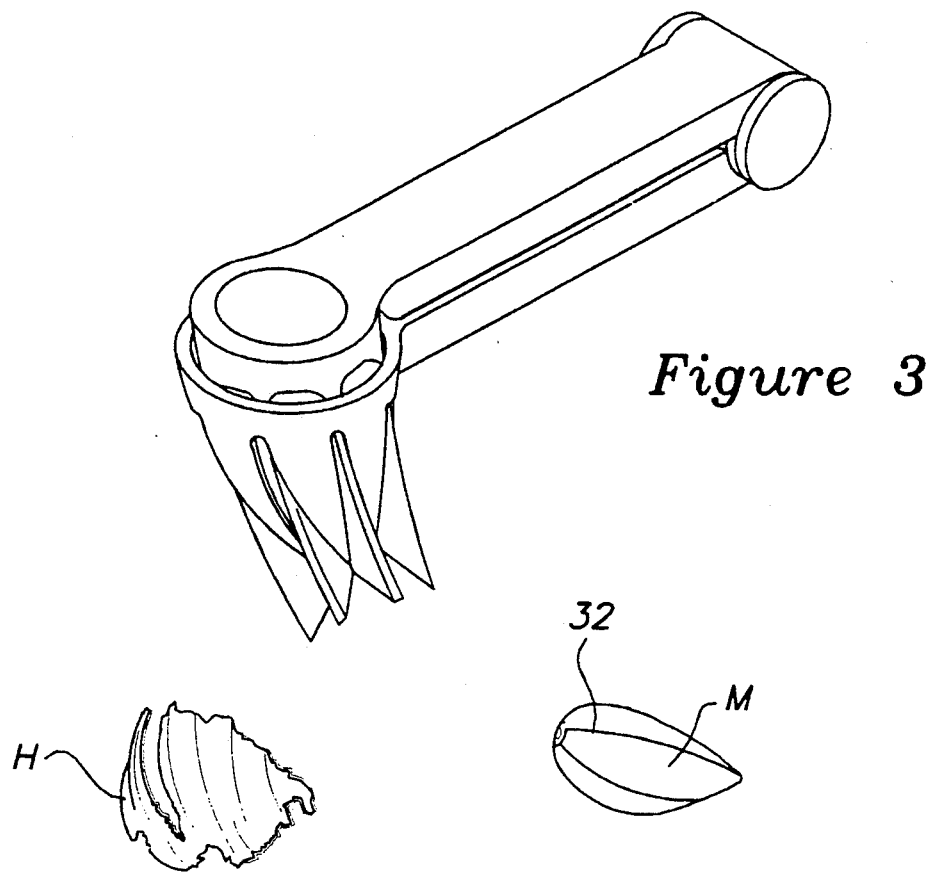
Figure 3
Figure 3A
Figure 3B
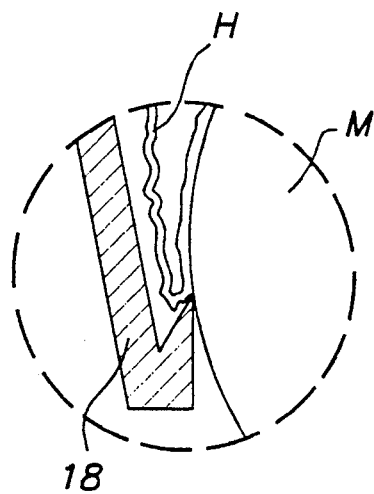
Figure 4

METHOD AND APPARATUS FOR PEELING PRODUCE SUCH AS GARLIC

CROSS-REFERENCE TO RELATED APPLICATION

This application is a continuation of U.S. patent application Ser. No. 07/873,459, filed Apr. 24, 1992, now abandoned.

TECHNICAL FILED

This invention relates generally to an apparatus and a method for removing the outer skin or husk from the meat of produce.

BACKGROUND OF THE INVENTION

Equipment for removing the inedible outer layers of garlic cloves has generally been unsatisfactory. The device disclosed in U.S. Pat. No. 5,021,254 attempts to remove the inedible skin by using pressurized air. The device disclosed in U.S. Pat. No. 5,065,672 uses an abrasive rotary disk. In general, however, particularly for manually removing the skin from a clove of garlic, the conventional technique is to use a knife to cut open the skin and peel the skin off the firm meat.

SUMMARY OF THE INVENTION

It is one aspect of the present invention to provide an apparatus for pressing the meat of a clove of garlic free from the surrounding husk or skin.

It is another object of this invention to provide an apparatus for peeling garlic which is easy to use and inexpensive to manufacture.

It is still another object of this invention to provide a method for peeling produce such as garlic by gripping the outer skin at circumferentially spaced locations and then pushing the inner meat through the skin. In the preferred form of the embodiment, the method includes cutting or tearing kerfs in the husk to remove the husk from the meat more freely.

The apparatus object of the invention is best obtained by providing cup means having an entrance end and an opposite, exit end, the exit end having a plurality of flexible, circumferentially spaced prongs converging inwardly toward the exit end, with the prongs having inwardly protruding gripping members adjacent the exit end for engaging the husk, and plunger means for pushing the produce through and out of the exit end past the gripping members, wherein the gripping members penetrate the husk to hold the husk as the plunger pushes the inner meat out of the exit end, free of the husk.

In the preferred form of the apparatus, the gripping members have sharp terminal ends which serrate the husk to allow it to separate from the meat more easily as the plunger pushes the garlic past the sharp terminal ends.

The method object is best obtained by gripping the husk at several circumferentially spaced locations and pushing against the meat to push the meat past the husk. The preferred method step includes serrating the husk while the meat is pushed out of the husk.

The invention will be described herein with reference to garlic for purposes of clarity; however, the invention is also applicable to any produce, for example, shallots, which have a firm inner meat and a fibrous outer skin or husk.

BRIEF DESCRIPTION OF THE DRAWINGS

FIG. 1 is an isometric view showing one embodiment of the invention.

FIG. 2 is an isometric view showing the garlic peeling apparatus in a second, intermediate mode of operation.

FIG. 3 is an isometric view of FIG. 1 showing garlic peeling apparatus in the final mode of operation.

FIG. 3A shows the apparatus in a final mode of operation, where the meat of the garlic has been pressed out of the husk.

FIG. 3B is a fragmentary illustration showing the shredded form of the husk after it has been separated from the meat of the garlic.

FIG. 4 is a fragmentary detail in cross section of an exit end of part of the garlic peeling apparatus.

DETAILED DESCRIPTION OF THE INVENTION

Figure 5:
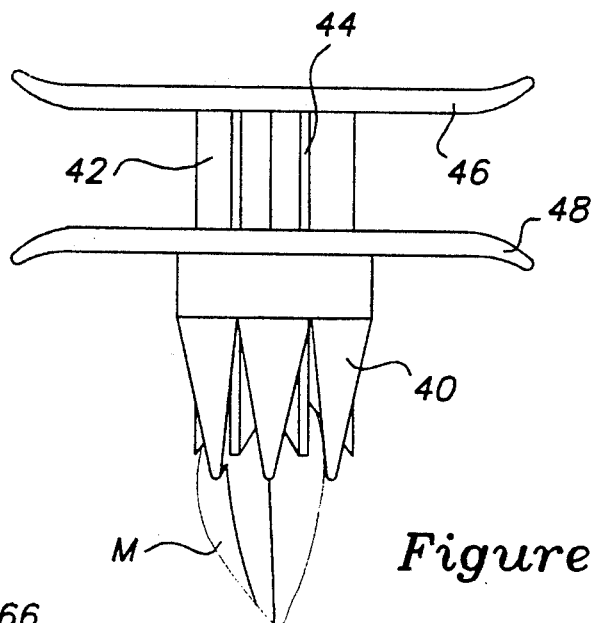
FIG. 5 is a second embodiment of the peeling apparatus.

As best shown in FIGS. 1–4, the first embodiment of the peeling apparatus includes a cup 10 having an entrance end 11 and an exit end 12. The entrance end is a single continuous integral ring. The exit end is made up of a plurality of spaced prongs 14 having a natural spring bias radially inward and separated by gaps or spaces 16. Each of the prongs has a gripping member 18, preferably a form of sharpened point, protruding from an inner wall of the prong as shown in FIG. 4.

The peeling apparatus also has a plunger 20 having a plurality of circumferentially spaced, laterally protruding fingers or flanges 22. These flanges are aligned with the spaces 16 between the prongs 14 so that when the plunger is pushed through the cup, the garlic clove expands the prongs, with the fingers passing within the spaces between the prongs. Adjacent fingers form entrapment compartments 24, as best shown in FIG. 2.

The plunger and cup are each integrally joined to lever arms 26 and 28, respectively, which are pivotally connected by a conventional pivot pin mechanism 30.

Preferably, the parts of the apparatus are formed from injection-molded plastic, making manufacture simple and inexpensive.

A typical garlic clove G has a husk or skin H and an inner kernel or meat M. In operation, the plunger is raised from the cup and a clove of garlic is dropped into the cup. The plunger is then firmly squeezed into the cup, with the sharp points holding the husk and serrating it as the fingers push the meat out of the husk. The peeled meat is shown in FIG. 3A. In some instances, the sharp points 14 will actually also slightly serrate the meat, as shown by the line 32 in FIG. 3A. The husk usually is shredded or split open, as shown in FIG. 3B.

Figure 9:
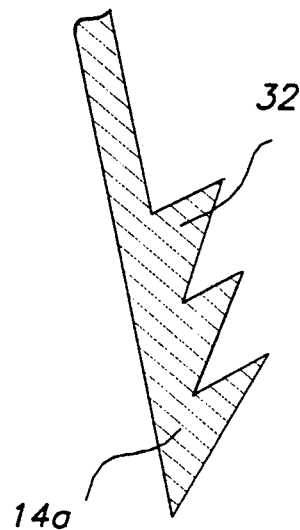
FIG. 9 is a fragmentary detail similar to FIG. 4 showing another form of gripping means at the exit end of the apparatus.
Figure 10:
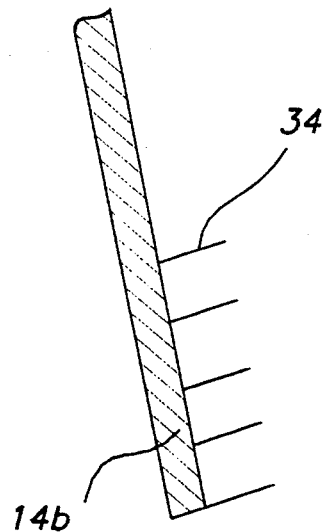
FIG. 10 shows still another fragmentary detail of another form of gripping means at the exit end of the apparatus.

The gripping members can take several forms. FIG. 9 shows a sawtooth or spaced set of gripping points 32 on prongs 14a. FIG. 10 shows a plurality of sharpened pins 34, either aligned or randomly located on the end of prongs 14b.

FIG. 5 shows another embodiment of the invention. In this embodiment, the cup 40 is more axially straight as compared to the embodiment of FIG. 1, in which the cup and the plunger each have a slight curvature along the radius from the pivot 30. In the embodiment of FIG. 5, there is no pivoting action of the plunger into the cup, merely a straight reciprocation, so no curvature is necessary. The plunger 42 in this embodiment also has a plurality of circumferentially spaced fingers 44, as in FIG. 1. In all other respects, the plunger and cup are the same as in FIG. 1.

To reciprocate the plunger and the cup relative to one another, the cup and the plunger are each provided with laterally extending handles 46 and 48, respectively. The plunger is pressed into the cup by grasping the handles in the left and right hand and squeezing them together.

Figure 6:
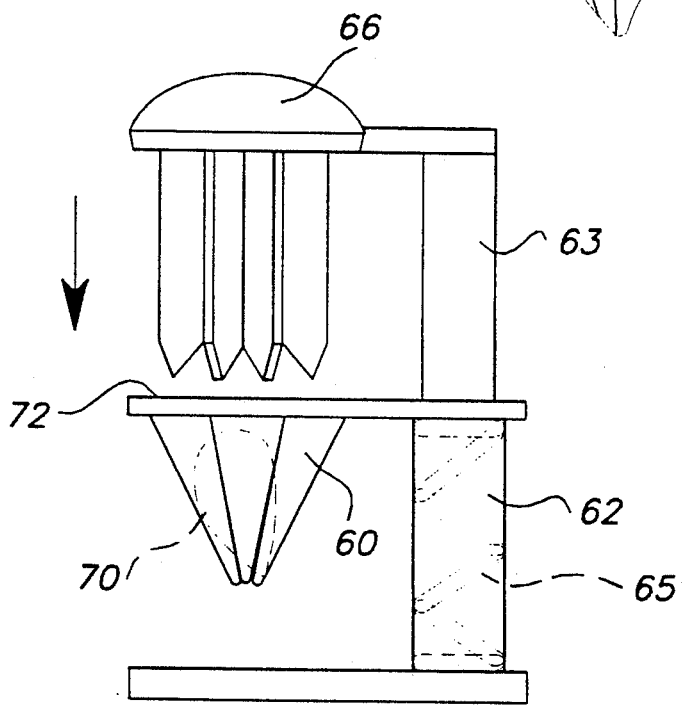
FIG. 6 is a third embodiment of the invention, showing a side elevation.
Figure 7:
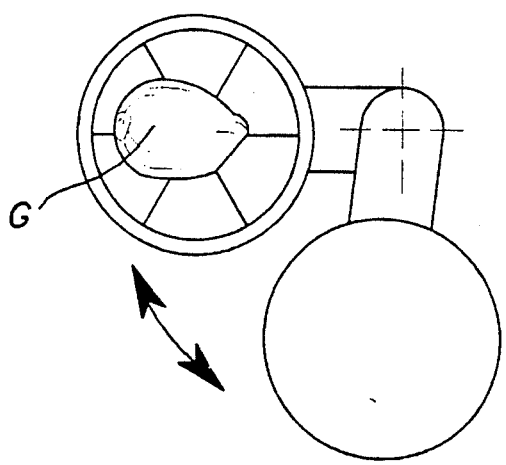
FIG. 7 is a top plan view of the apparatus shown in FIG. 6.

FIGS. 6 and 7 show an embodiment better adapted for commercial use. In this embodiment, the cup 60, made similar to the cup in FIG. 5, is rigidly mounted on a hollow post 62 connected to a base 64. A plunger 66, having circumferentially spaced fingers 68 which mesh between the circumferentially spaced prongs 70 of the cup, is mounted on a post 63 that reciprocates within the post 62. Preferably, in this embodiment, the post 63 not only reciprocates against a spring 65 within the post 62 but can also pivot about the post 62 to open the area above the entrance 72 of the cup 60. In this embodiment, a clove is dropped into the cup and the plunger is swung into alignment with the cup and then pushed rapidly downward to peel the garlic clove.

Figure 8:
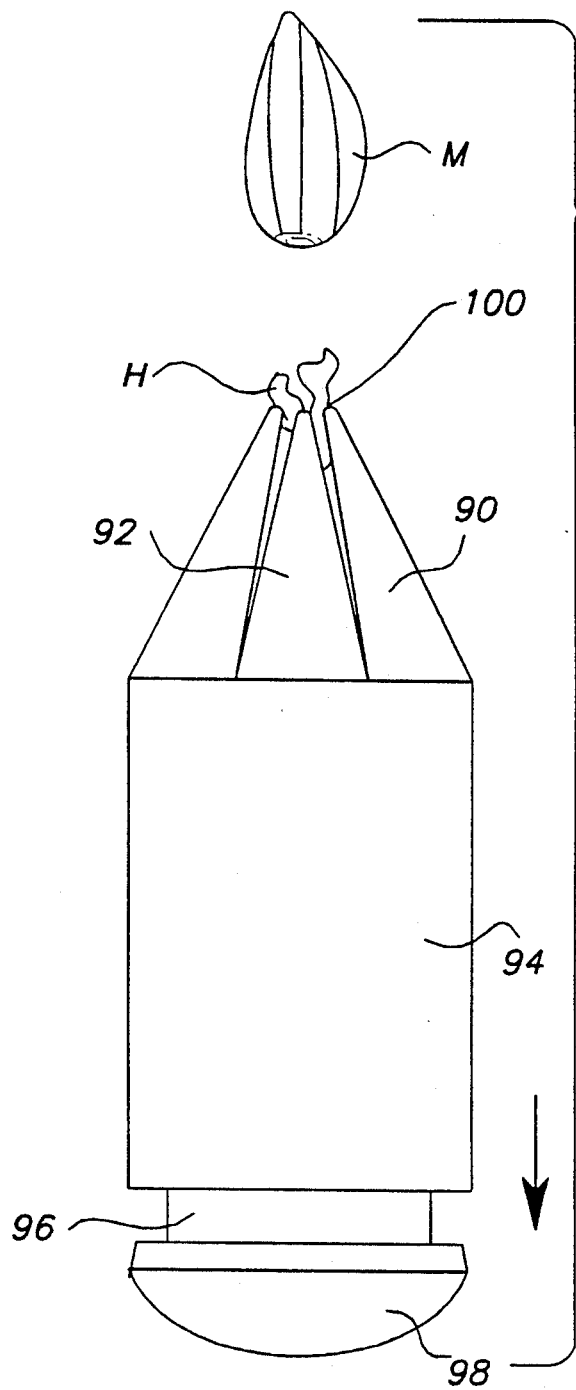
FIG. 8 is a side elevation of a fourth embodiment of the invention.

FIG. 8 shows still another embodiment, in which the cup 90 has prongs 92, as in the embodiment of FIG. 5. In this embodiment, the cup has an elongated body 94 which can be gripped with the hand. The plunger 96 is provided with the same circumferentially spaced fingers (not shown) as in the preferred embodiment and terminates at its lower end in a rubber cushion 98. In this embodiment, the plunger is separated from the cup, with the cup exit end 100 pointing downward. The plunger is then placed in the cup, trapping the garlic clove, and the cup and plunger are turned upside-down. Then the cup is lifted slightly and slammed down against the plunger to push the peeled garlic meat upward, out of the exit end of the cup.

In all of the embodiments, the prongs are flexible and are provided with various types of gripping members, as shown and described earlier.

The method of the invention is to grip the garlic husk at circumferentially spaced points around it and then to press the meat relatively outwardly of the husk while still gripping the husk. Preferably, the method includes the step of serrating the husk as the meat is pressed relative to the husk for splitting the husk.

While the preferred embodiments of the invention have been illustrated and described, it should be understood that variations will be apparent to those skilled in the art without departing from the principles herein. Accordingly, the invention is not to be limited to the specific embodiments illustrated in the drawing.

I claim:

1. Apparatus for peeling the husk from garlic cloves of the type having a firm inner meat and a fibrous husk, the garlic cloves having a leading surface and a trailing surface in the direction of movement through the apparatus, comprising:

cup means having an entrance end and an opposite exit end, the exit end having a plurality of flexible, circumferentially spaced prongs converging radially inward and away from the entrance end, said prongs having inwardly protruding gripping members closely spaced to one another adjacent the exit end for engaging the husk of the garlic cloves and moving along the husk from its leading surface to its trailing surface; and plunger means for pushing the garlic cloves unidirectionally through and out of the exit end past the gripping members, wherein the gripping members penetrate the husk to hold the husk as the plunger pushes the inner meat out of the exit end separated from the husk.

2. The apparatus of claim 1, said gripping members having sharp terminal points and wherein said sharp terminal points serrate the husks to split the husks as the plunger pushes the produce past the sharp terminal ends.

3. The apparatus of claim 2, said gripping members having a point directed axially toward said entrance end and laterally inward.

4. The apparatus of claim 2, said gripping means including a series of axially spaced points extending axially toward said entrance and laterally inwardly.

5. The apparatus of claim 2 wherein said plunger means has an inner end, said inner end having circumferentially spaced, laterally outwardly protruding flanges aligned with spaces between the circumferentially spaced prongs in the cup means, and wherein said protruding flanges pass between and axially beyond the exit ends of the prongs to discharge the peeled meat from the cup means.

6. The apparatus of claim 1 wherein said plunger means has an inner end, said inner end having circumferentially spaced, laterally outwardly protruding flanges aligned with spaces between the circumferentially spaced prongs in the cup means, and wherein said protruding flanges pass between and axially beyond the exit ends of the prongs to discharge the peeled meat from the cup means.

7. The apparatus of claim 1, said cup means having a first pivot lever, said plunger means having a second pivot lever joined to said first pivot lever for swinging the plunger means relative to the cup means.

8. The apparatus of claim 1, said cup means having oppositely extending lateral first handles, said plunger means having oppositely extending lateral second handles overlying and aligned with said first handles, and wherein the plunger means is moved into said cup means by squeezing said first and second handles together.

9. The apparatus of claim 1, said cup means having a lateral first support, said support connected to a rigid base, said plunger means having a lateral second support reciprocally mounted on said base, said plunger means movable into and out of said cup means.

10. The apparatus of claim 9, said lateral second support also being pivotally mounted on said base for swinging movement laterally of said cup means for opening the space above the entrance to said cup means for placing a produce into the cup means.

11. The apparatus of claim 1, said plunger means having an outer end, a resilient cushion on the outer end, and wherein the plunger means is passed into the cup means by gripping the cup means and striking the cushioned outer end of the plunger against a surface to drive the plunger into the cup means.

12. A garlic peeler for garlic cloves having a husk covering firm meat, said garlic peeler having a radially outer member having an entrance end and a plurality of circumferentially spaced flexible prongs converging radially inward and axially away from the entrance end to define an exit end, said prongs having having a plurality of laterally inwardly extending terminal points to grip and cut into said husk to serrate the husk and hold it; and a plunger having radially inwardly extending, circumferentially spaced fingers aligned with the spaces between the spaced prongs for pushing the garlic unidirectionally through the exit end of the outer member and removed from the peeler, causing substantially the entire husk to be split and separated from the meat in one motion.

13. The apparatus of claim 12, the circumferentially spaced fingers defining entrapment compartments, said shredded husk collecting in said compartments as the meat is pushed out of the husk.

14. An apparatus for removing the husk from garlic cloves of the type having a firm inner meat and a fibrous husk, comprising:

cup means having an entrance end and an exit end, the exit end having a plurality of flexible means with inwardly protruding terminal gripping elements for separating the husk from the inner meat; and plunger means for pushing the produce into the exit end, both the inner meat and the husk exiting through the exit end in the same direction substantially separated from each other.

15. The apparatus of claim 14, wherein the inner meat exits the exit end in at least one substantially large piece.

16. Apparatus for peeling the husk from garlic cloves having a firm inner meat and a fibrous husk, each garlic clove having a leading surface and a trailing surface in the direction of movement through the apparatus, comprising:

cup means having an entrance end and an opposite exit end, the exit end having a plurality of flexible, circumferentially spaced prongs converging radially inward and away from the entrance end, each of said prongs having at least one laterally inwardly extending terminal gripping point, said gripping points being closely spaced to one another at the exit end for engaging the husk of the garlic clove and moving along the husk from its leading surface to its trailing surface;

plunger means for pushing the garlic clove unidirectionally through and out of the exit end and past the gripping points, wherein the gripping points penetrate the husk to grasp the husk as the plunger pushed the inner meat out of the exit end separated from the husk.

17. The apparatus of claim 16, wherein said terminal gripping points include a sharp point diverging laterally from the exit end outwardly to a wider connection area with the prongs, the wider connection area lying in a plane perpendicular to a path from the entrance end through the exit end.

18. The apparatus of claim 16, said prongs each including a plurality of laterally inwardly extending terminal gripping points.

* * * * *